US009107130B2

(12) United States Patent
Pandey et al.

(10) Patent No.: US 9,107,130 B2
(45) Date of Patent: Aug. 11, 2015

(54) METHOD AND APPARATUS FOR TRAFFIC OFFLOADING PROCEDURE MANAGEMENT IN A PUBLIC SAFETY COMMUNICATION SYSTEM

(71) Applicant: MOTOROLA SOLUTIONS, INC, Schaumburg, IL (US)

(72) Inventors: Aparna Pandey, Chicago, IL (US); Harish Bhandiwad, Schaumburg, IL (US); Randy L. Ekl, Lake Zurich, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 253 days.

(21) Appl. No.: 13/920,537

(22) Filed: Jun. 18, 2013

(65) Prior Publication Data

US 2014/0370895 A1  Dec. 18, 2014

(51) Int. Cl.
*H04W 36/00* (2009.01)
*H04W 36/22* (2009.01)
*H04W 28/08* (2009.01)

(52) U.S. Cl.
CPC .............. *H04W 36/22* (2013.01); *H04W 28/08* (2013.01)

(58) Field of Classification Search
CPC ..... H04W 28/08; H04W 28/10; H04W 36/22; H04W 28/02; H04W 28/0289
USPC .......... 455/436–444, 518, 519; 370/331–333, 370/230–232, 235, 236, 237
See application file for complete search history.

(56) References Cited

U.S. PATENT DOCUMENTS

| | | | |
|---|---|---|---|
| 6,333,921 B1 | 12/2001 | Grube et al. | |
| 6,490,452 B1 | 12/2002 | Boscovic et al. | |
| 6,778,829 B1 | 8/2004 | McDonald et al. | |
| 7,991,404 B2* | 8/2011 | Kagimoto et al. | 455/453 |
| 8,059,809 B1 | 11/2011 | Zhang et al. | |
| 8,731,557 B2* | 5/2014 | Svedevall et al. | 455/436 |
| 2002/0019157 A1 | 2/2002 | Oguma | |
| 2002/0026473 A1 | 2/2002 | Gourraud | |

(Continued)

FOREIGN PATENT DOCUMENTS

| | | |
|---|---|---|
| EP | 2265071 B1 | 2/2012 |
| WO | 2009128751 A1 | 10/2009 |

OTHER PUBLICATIONS

PCT International Search Report Dated Sep. 16, 2014 for Counterpart Application PCT/US2014/041684.

*Primary Examiner* — Allahyar Kasraian
(74) *Attorney, Agent, or Firm* — Steven A. May

(57) ABSTRACT

A system provides for traffic offloading in a Public Safety communication system. The system includes multiple user equipment (UEs), each a member of a same communications group, and a services network element configured to receive information comprising an identifier of the communications group, an identifier of each UE of the multiple UEs, and an identifier of a cell of a primary network where each UE resides; store, in association with each UE identifier, the communications group identifier and the primary network cell identifier; determine that a primary network cell is congested; responsive to determining that the cell is congested, determine a subset of the multiple UEs that are members of the communications group, reside in the congested cell, and are capable of being served by one or more secondary networks; and instruct the subset of UEs to offload their communications group traffic to the one or more secondary networks.

20 Claims, 7 Drawing Sheets

(56) References Cited

U.S. PATENT DOCUMENTS

| | | |
|---|---|---|
| 2005/0227722 A1 | 10/2005 | Harris et al. |
| 2007/0202908 A1 | 8/2007 | Shaffer et al. |
| 2010/0040020 A1 | 2/2010 | Chen |
| 2010/0246468 A1 | 9/2010 | Santhanam et al. |
| 2011/0250885 A1* | 10/2011 | Zarri et al. ............... 455/435.1 |
| 2012/0214520 A1* | 8/2012 | Bergqvist et al. ............ 455/458 |
| 2013/0010751 A1 | 1/2013 | Rydnell et al. |
| 2013/0070594 A1 | 3/2013 | Garcia et al. |
| 2013/0077482 A1 | 3/2013 | Krishna et al. |
| 2013/0183971 A1* | 7/2013 | Tamaki et al. ............... 455/436 |
| 2014/0355443 A1* | 12/2014 | Smith et al. .................. 370/235 |

\* cited by examiner

METHOD AND APPARATUS FOR TRAFFIC OFFLOADING PROCEDURE MANAGEMENT IN A PUBLIC SAFETY COMMUNICATION SYSTEM

FIELD OF THE INVENTION

The present invention relates generally to wireless communication systems, and more specifically to traffic offloading procedure management in a Public Safety communication system.

BACKGROUND OF THE INVENTION

Traffic offloading procedure management is a key component of mission critical Public Safety (PS) communication systems. There is an expectation that PS systems can manage wireless resources and grant calls if the required resources are available and find resources if the required resources are not. Further, there is an expectation that PS communication should be available via broadband systems, such as a 3GPP (Third Generation Partnership Project) LTE (Long Term Evolution) communication system. By providing for PS communications over broadband systems, better protection is provided for first responders at an incident scene, such as police, fire and ambulance personnel, along with protection of the communities they serve.

It is expected that at an incident scene where there is a high user density, aside from the primary wireless network such as PS LTE, multiple secondary wireless networks will coexist. To better serve the PS personnel, it is imperative that congestion be managed in the primary wireless networks by offloading certain traffic to secondary networks on the scene. Traffic offloading procedures rely on multi-mode devices which include support of primary and secondary networks, connecting to multiple networks simultaneously and transmitting and receiving a set of bearer traffic on primary network while transmitting and receiving a second set of bearer traffic on one or more secondary networks.

Many PS personnel, especially during an incident scene, may use group applications such as Group voice calls, Group Push-to-talk, Group video streaming, Group data sharing etc., on the scene. Very often some of these group traffic types may create a much higher localized congestion in the primary network due to higher user density. Therefore, there exists a need to harness localized group communications sessions as candidates for traffic offloading to ease congestion in the primary network during high user density scenarios such as an incident scene.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
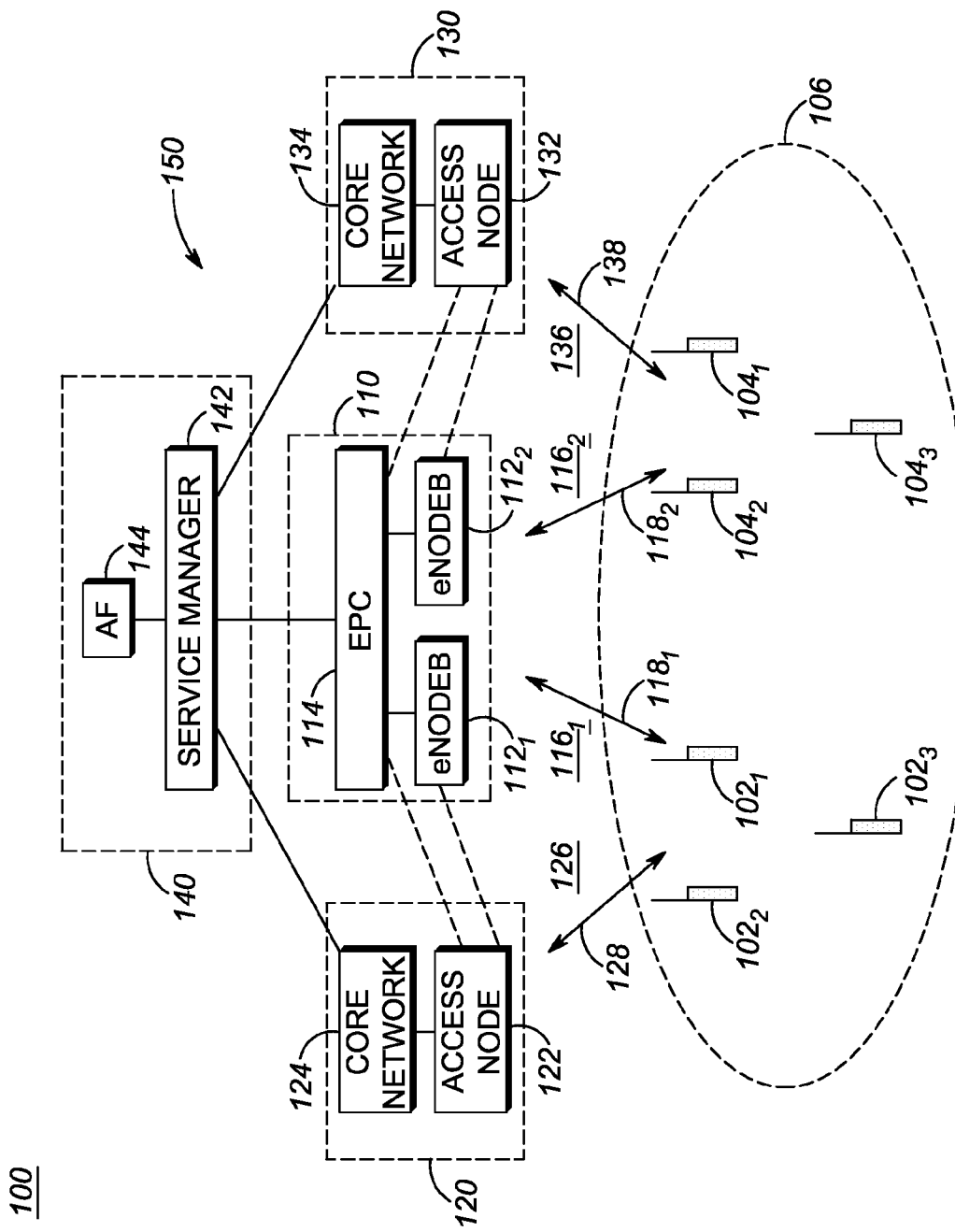
FIG. 1 is a block diagram of a wireless communication system in accordance with various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need that exists for management of public safety communication system resources, a system is provided that provides for traffic offloading procedure management in a Public Safety communication system. The system includes multiple user equipment (UEs) that are each a member of a same communications group and a services network element that is configured to receive information comprising an identifier of the communications group, an identifier of each UE of the multiple UEs, and an identifier of a cell of a primary network where each UE resides; store, in association with the identifier of each UE, the identifier of the communications group and the identifier of the cell of the primary network where the UE resides; determine that a cell of the primary network is congested; in response to determining that the cell is congested, determine a subset of the multiple UEs that are members of the communications group, reside in the congested cell, and are capable of being served by one or more secondary networks; and instruct the subset of UEs to offload their traffic associated with the communications group to the one or more secondary networks.

Generally, an embodiment of the present invention encompasses a method for traffic offloading procedure management in a Public Safety communication system. The method includes receiving, by a service network element, information comprising an identifier of a communications group, an identifier of each UE of multiple UEs that are members of the communications group, and an identifier of a cell of a primary network where each UE of the multiple UEs resides; and storing, by the service network element and in association with the identifier of each UE of the multiple UEs, the identifier of the communications group and the identifier of the cell of the primary network where the UE resides. The method further includes determining, by the service network element, that a cell of the primary network is congested, in response to determining that the cell of the primary network is congested; determining, by the service network element, a subset of the multiple UEs, wherein the subset of the multiple UEs are members of the communications group, reside in the congested cell, and are capable of being served by one or more secondary networks; and instructing, by the service network element, the subset of the multiple UEs to offload their traffic associated with the communications group to the one or more secondary networks.

Another embodiment of the present invention encompasses a services network element that provides for traffic offloading procedure management in a Public Safety (PS) communication system. The services network element includes a processor and one or more network interfaces that are configured to receive information comprising an identifier of a communications group, an identifier of each UE of multiple UEs that are members of the communications group, and an identifier of a cell of a primary network where each UE of the multiple UEs resides. The services network element further includes an at least one memory device that is configured to store instructions that, when executed by the processor, cause the processor to store, in association with the identifier of each UE of the multiple UEs, the identifier of the communications group and the identifier of the cell of the primary network where the UE resides; determine that a cell of the primary network is congested; in response to determining that the cell of the primary network is congested, determine a subset of the multiple UEs, wherein the subset of the multiple UEs are members of the communications group, reside in the congested cell, and are capable of being served by one or more secondary networks; and instruct the subset of the multiple UEs to offload their traffic associated with the communications group to the one or more secondary networks.

Yet another embodiment of the present invention encompasses a system that provides for traffic offloading procedure management in a Public Safety communication system. The system includes multiple UEs that are each a member of a same communications group and a services network element. The services network element is configured to receive information comprising an identifier of the communications group, an identifier of each user equipment (UE) of the multiple UEs, and an identifier of a cell of a primary network where each UE of the multiple UEs resides; store, in association with the identifier of each UE of the multiple UEs, the identifier of the communications group and the identifier of the cell of the primary network where the UE resides; determine that a cell of the primary network is congested; in response to determining that the cell of the primary network is congested, determine a subset of the multiple UEs, wherein the subset of the multiple UEs are members of the communications group, reside in the congested cell, and are capable of being served by one or more secondary networks; and instruct the subset of the multiple UEs to offload their traffic associated with the communications group to the one or more secondary networks.

Turning now to the drawings, the present invention may be more fully described with reference to FIGS. 1-5C. FIG. 1 is a block diagram of a wireless communication system 100 in accordance with various embodiments of the present invention. Communication system 100 includes multiple wireless user equipment (UEs) $102_1$-$102_3$, $104_1$-$104_3$, (six shown) for example but not limited to a cellular telephone, a radiotelephone, or a Personal Digital Assistant (PDA), personal computer (PC), or laptop computer equipped for wireless communications. Each UE $102_1$-$102_3$, $104_1$-$104_3$ includes one or more application layer clients which communicate with a corresponding element of a services network 140 via an intervening Evolved Packet Core 114 of a primary network 110, or a core network 124, 134 of a secondary network 120, 130, of an infrastructure 150 of communication system 100. For the purposes of describing the principles of the present invention, it is assumed herein that each of UEs $102_1$-$102_3$ and $104_1$-$104_3$ belongs to a same communications group 106. Communications group 106 is a group of UEs that are participants in a group communications session as recipients and/or source of group communications traffic. Group communications sessions can incorporate voice, video, data, graphics, still images, thermal images etc. or a combination thereof. Further, each of UEs $102_1$-$102_3$ and $104_1$-$104_3$ is a multi-mode device, that is, supports wireless communications over multiple wireless technologies, and more particularly over a primary network and a secondary network as described below.

Infrastructure 150 of communication system 100 includes primary network 110, one or more secondary networks 120, 130 (two shown), and services network 140. Primary network 110 includes an access network having multiple eNodeBs $112_1$, $112_2$ (two shown). Each eNodeB $112_1$, $112_2$ provides wireless communication services to user equipment (UEs) located in a corresponding cell $116_1$, $116_2$ serviced by the eNodeB via a corresponding air interface $118_1$, $118_2$. For example, as depicted in FIG. 1, UEs $102_1$-$102_3$ reside in cell $116_1$ and are served by eNodeB $112_1$ via air interface $118_1$ and UEs $104_1$-$104_3$ reside in cell $116_2$ and are served by eNodeB $112_2$ via air interface $118_2$. Although FIG. 1 depicts each eNodeB $112_1$, $112_2$ as associated with a single cell each, in alternative configurations a single eNodeB may be associated with several adjacent cells, typically three.

Primary network 110 further includes an Evolved Packet Core (EPC) 114 residing between the access network and services network 140. Although not depicted in FIG. 1, as is known in the art EPC 114 may include a Mobility Management Entity (MME), multiple gateways, such as a Serving Gateway and a Public Data Network Gateway (PDN GW), a Policy Control and Charging Rules Function (PCRF), and a Home Subscriber Server (HSS). Each eNodeB $112_1$, $112_2$ is coupled to the MME via an 'S1-MME' interface and to the Serving Gateway via an 'S1-U' interface. In turn, the Serving Gateway is coupled to the PDN GW via an 'S5' interface and to MME via an 'S11' interface. The MME further is coupled to the HSS via an 'S6a' interface, the HSS is coupled to PCRF via an 'Sp' interface, and the PCRF is coupled to the PDN GW via a 'Gx' interface.

The one or more secondary networks 120, 130 each includes a respective one or more access nodes 122, 132, such as a base station, a Node B, an eNodeB, an access point (AP), or any other wireless network access node known in the art.

Each of access nodes 122, 132, and correspondingly secondary networks 120, 130, provides wireless communication services to mobile stations, such as UEs $102_1$-$102_3$ and $104_1$-$104_3$, located in a corresponding coverage area, for example, a cell or a cell sector (and which coverage areas, for ease of reference, are also referred to herein as 'cells') 126, 136 via a corresponding air interface 128, 138. For example, as depicted in FIG. 1, coverage area 126 associated with access node 122 of secondary network 120 overlaps with cell $116_1$ serviced by eNodeB $112_1$. Correspondingly, one or more of UEs $102_1$-$102_3$ serviced by eNodeB $112_1$ via cell $116_1$ and air interface $118_1$ of primary network 110, also are located in, and may be serviced in the coverage area 126 by access node 122 and air interface 128 of secondary network 120. Similarly, as depicted in FIG. 1, one or more of UEs $104_1$-$104_3$ serviced by eNodeB $112_2$ via cell $116_2$ and air interface $118_2$ of primary network 110, also are located in, and may be serviced in coverage area 136 by access node 132 and air interface 138, of secondary network 130. In other embodiments of the present invention, one or more of UEs $102_1$-$102_3$ further or instead may be located in, and may be serviced in coverage area 136 via access node 132 and air interface 138 of secondary network 130, and/or one or more of one or more of UEs $104_1$-$104_3$ further or instead may be located in, and may be serviced in coverage area 126 via access node 122 and air interface 128 of secondary network 120.

Each air interface $118_1$, $118_2$, 128, 138 includes a forward link that includes multiple traffic channels, such as, shared, dedicated, and default bearers, and forward link common and dedicated signaling channels. Each air interface $118_1$, $118_2$, 128, 138 further includes a reverse link that includes multiple traffic channels, such as shared, dedicated, and default bearers, and reverse link common and dedicated signaling channels.

Services network 140 comprises one or more Application Servers (ASs) or other services network elements implementing an Application Function (AF) (collectively referred to herein as an AF) 144 (one shown) and that is coupled to a Service Manager (SM) 142. SM 142 may have a bearer connection with EPC 114 via an 'SGi' interface and may have a signaling connection with the EPC via an 'Rx' interface. From the perspective of the 3GPP (Third Generation Partnership Project) LTE (Long Term Evolution) standards regarding Evolved Packet Core 114, a network entity with which the EPC, and in particular a PCRF, communicates using the Rx protocol is considered to be an Application Function and thus SM 142 also may be considered to be an Application Function or alternatively be considered to be collocated with the Application Function AF 144.

In the depicted embodiment, SM 142 is shown to reside outside EPC 114. In alternative embodiments of the present invention, SM 142 may reside within any of EPC 114 or core networks 124 and 134. In some embodiments of the present invention, SM 142 functionality may be distributed amongst more than one node with ample inter-node communications for synchronization. Examples of such nodes include elements of the core networks, access nodes, UEs, etc. Further, SM 142 implements a traffic offloading management function that directs participants in a group communication session, for example, a Push-to-Talk (PTT) call for a group, or a group video streaming session, from a primary network to a secondary network. In some embodiments of the present invention, SM 142 also implements a bearer management function as a part of the traffic offloading procedure management function. In particular, the bearer management function is responsible for requesting for bearers on behalf of either the UEs or the AF for an application, bearer prioritization and pre-emption depending on user and application priority, and keeping track of bearer requests and bearer teardowns.

In one embodiment of the present invention, each of access nodes 122, 132 is part of a secondary network 120, 130 that is different from primary network 110. For example, access node 122 is part of a first secondary network 120 comprising a core network 124 coupled to access node 122, and access node 132 is be part of a second secondary network 130 comprising another core network 134 coupled to access node 132. In such an embodiment, secondary networks 120 and 130 each may be operated by the same, or by a different, network operator than the operator of primary network 110. Further, in such an embodiment, each of networks 120 and 130, and in particular core networks 124 and 134, is in communication with services network 140. That is, access node 122 uses core network 124 for a backhaul of uplink data received from, and to receive downlink data intended for, UEs serviced by the access node, and access node 132 uses core network 134 for a backhaul of uplink data received from, and to receive downlink data intended for, UEs serviced by the access node. However, in another embodiment of the present invention, one or more of access nodes 122 and 132, and correspondingly secondary networks 120 and 130, may be a 'nested' access network, that is, an access network/secondary network that uses EPC 114 as its core network for a backhaul of uplink data received from, and to receive downlink data intended for, UEs serviced by the access node/secondary network. In yet another embodiment of the present invention, one or more of access nodes 122 and 132, and correspondingly secondary networks 120 and 130, may be a 'nested' access network/secondary network in the sense that they use an eNodeB of primary network 110, that is, eNodeBs $112_1$ and $112_2$, as a backhaul for uplink data received from, and to receive downlink data intended for, UEs serviced by the access node/secondary network.

Figure 2:
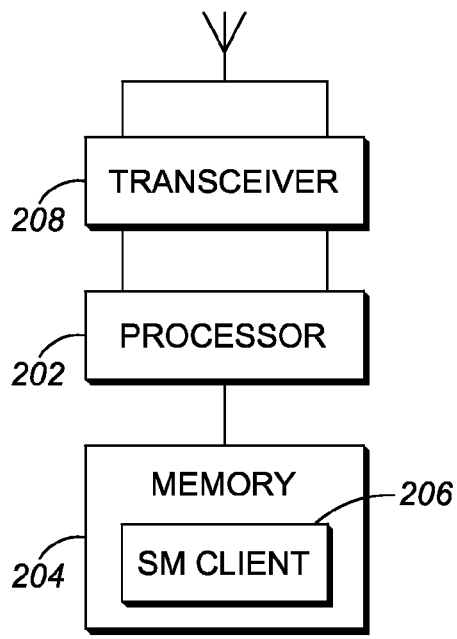
FIG. 2 is a block diagram of a user equipment of FIG. 1 in accordance with an embodiment of the present invention.
Figure 3:
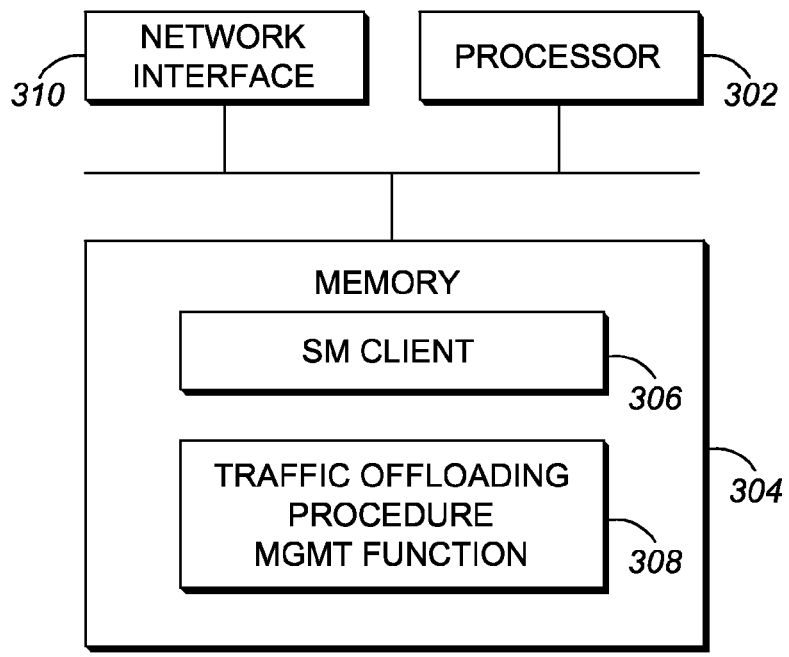
FIG. 3 is a block diagram of an application server of FIG. 1 in accordance with an embodiment of the present invention.

Referring now to FIGS. 2 and 3, block diagrams are provided of a UE 200, such as UEs $102_1$-$102_3$ and $104_1$-$104_3$, and of SM 142 in accordance with various embodiments of the present invention. Each of UE 200 and SM 142 includes a respective processor 202, 302, such as one or more microprocessors, microcontrollers, digital signal processors (DSPs), combinations thereof or such other devices known to those having ordinary skill in the art, which processor is configured to execute the functions described herein as being executed by the UE and SM. Each of UE 200 and SM 142 further includes a respective at least one memory device 204, 304, such as random access memory (RAM), dynamic random access memory (DRAM), and/or read only memory (ROM) or equivalents thereof, that is coupled to the processor and that maintains data and programs/instructions that may be executed by the associated processor and that allows the UE and SM to perform all functions necessary to operate in communication system 100.

In addition, at least one memory device 204 of UE 200 further maintains a UE identifier that uniquely identifies the UE in communication system 100 and a communications group identifier that identifies each communications group of which the UE is a member, such as communications group 106. In addition, at least one memory device 204 of UE 200 maintains one or more application layer clients 206 (one shown) that, when executed by processor 202, communicates with a corresponding application executed by SM 142. For example and with reference to FIGS. 2 and 3, the one or more application layer clients 206 may include a Service Manager (SM) client that would communicate with a SM client 306 maintained in the at least one memory device 304 of SM 142. UE 200 further includes a radio frequency (RF) transceiver

208 that includes one or more RF receivers (not shown) and one or more RF transmitters (not shown) capable of exchanging wireless messaging with each of eNodeBs $112_1$ and $112_2$ and access nodes 122 and/or 132.

SM 142 further maintains, in the at least one memory device 304 of the SM, a traffic offloading procedure management function 308, which traffic offloading procedure management function is executed by processor 302 of SM 142. Traffic offloading procedure management function 308 controls whether a UE connects to primary network 110 for a given group communications session or to a secondary network 120, 130, for the said group communications session and correspondingly controls an allocation of resources, and a level of congestion, in each of the primary and secondary networks. For example, when SM 142 services geographical regions associated with primary network 110 and secondary networks 120, 130, and a first cell, serviced by a first eNodeB of primary network 110, overlaps with a second cell, serviced by a second eNodeB of the primary network or by an access node of a secondary network 120, 130, traffic offloading procedure management function 308 may determine which UEs engaged in a same group communication session are capable of being serviced by both the first cell/eNodeB and the second cell/eNodeB/access node. In response to determining that the cell of the first eNodeB (of primary network 110) is congested, SM 142 may determine to offload the said group communications session of one or more such UEs from the first cell, or first eNodeB, to the second cell, or second eNodeB or access node, thereby reducing a level of congestion in the first cell. Furthermore, SM 142 also may be additionally responsible for mapping a first set of bearers associated with the group communications session amongst one or more UEs on the primary network to a second set of bearers on the secondary networks for the one or more UEs. For example, the first set of bearers can be dedicated bearers for each of the one or more UEs, whereas the second set of bearers can be fewer shared bearers to be shared by each of the one or more UEs. SM 142 further comprises one or more network interfaces 310 that interface with each of AF 144, EPC 114, core network 124, and core network 134, and via which the SM receives communications from each of the AF, EPC, and core networks. The one or more network interfaces 310 are each coupled to processor 302 and at least one memory device 304.

The functionality described herein as being performed by each of UEs $102_1$-$102_3$ and $104_1$-$104_3$ and SM 142 is implemented with or in software programs and instructions stored in the respective at least one memory device 204, 304 associated with the UE and SM and executed by a processor 202, 302 associated with the UE and SM. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE, IMS core network gateway, and application server. Based on the present disclosure, one skilled in the art will be readily capable of producing and implementing such software and/or hardware without undue experimentation.

In order for a UE, such as UEs $102_1$-$102_3$ and $104_1$-$104_3$, to engage in a communication session via an eNodeB or access node, such as eNodeBs $112_1$ and $112_2$ and access nodes 122 and 132, each of UEs $102_1$-$102_3$ and $104_1$-$104_3$ and infrastructure 150 operates in accordance with one or more known wireless telecommunications protocols. For example, primary network 110 preferably operates in accordance with the Third Generation Partnership Project (3GPP) Long Term Evolution (LTE) standards that provide packet data communication services to UEs serviced by the network; however, other applicable packet data networks include but are not limited to a 3GPP2 communication system or derivatives of a 3GPP2 communication system, WiMAX packet data networks, and packet data networks that operate in accordance with the IEEE (Institute of Electrical and Electronics Engineers) 802.xx standards, for example, the 802.11, 802.15, or 802.16 or 802.20 standards.

Secondary networks 120 and 130 also may operate in accordance with the 3GPP LTE standards or may operate in accordance with any other wireless communication standard that may support a group communication, such as 2G (second generation) or 3G (third generation) legacy standards, for example, the Global System for Mobile Communications (GSM) standards and its derivatives, such as the Enhanced Data rates for GSM Evolution (EDGE), General packet radio service (GPRS), High Speed Packet Access (HSPA) standards; Code division multiple access (CDMA) standards and its derivatives, such as the Evolution-Data Optimized (EVDO) standards; or other broadband standards such as an Institute of Electrical and Electronics Engineers (IEEE) 802.xx standard, including the 802.11, 802.15, or 802.16 or 802.20 standards, and a Land Mobile Radio System. To ensure compatibility, radio system parameters and call processing procedures are specified by the standards, including call processing steps that are executed by an UE and an access network serving the UE and between the access network and associated elements of the infrastructure.

Figure 4A:
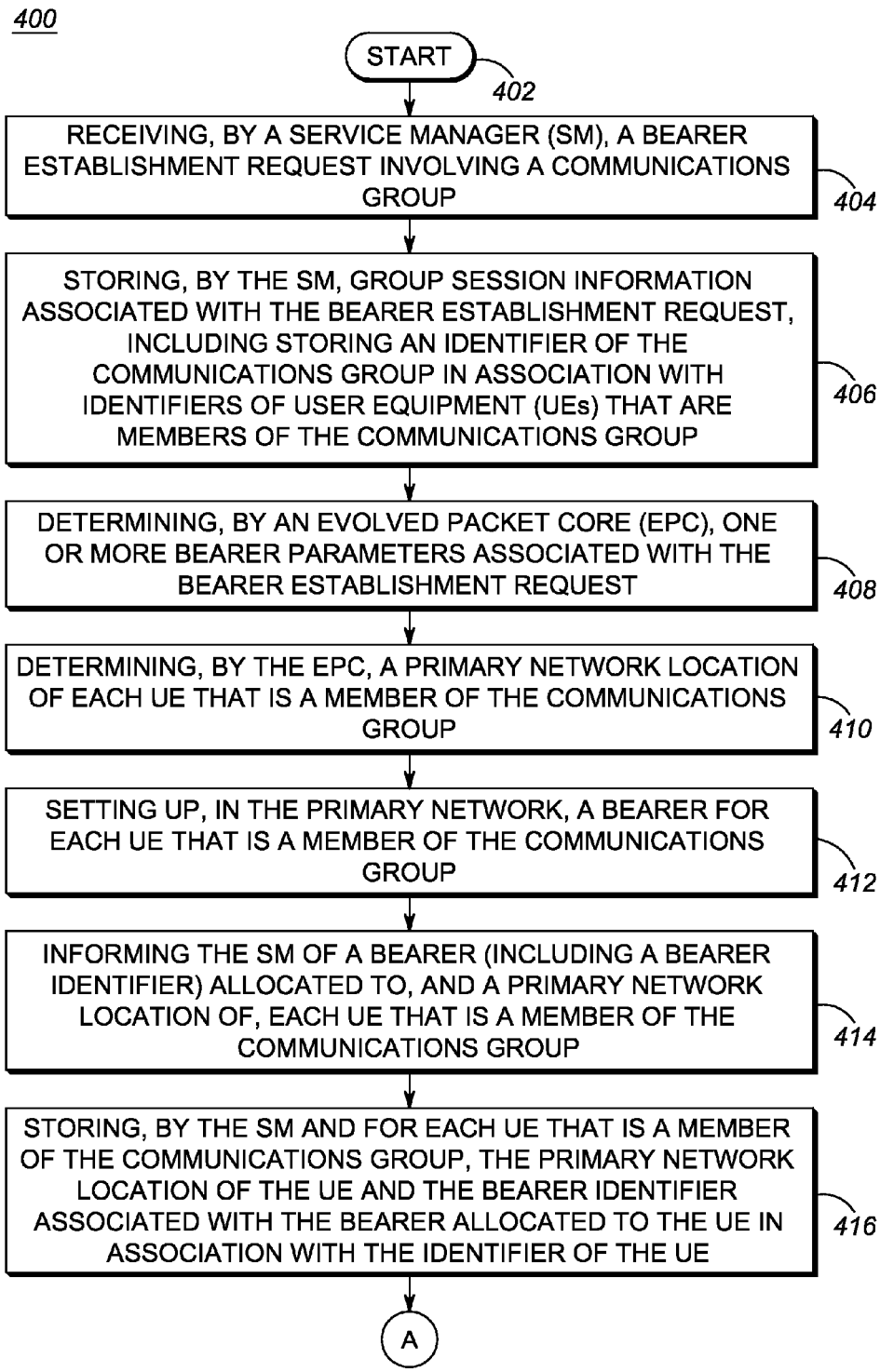
FIG. 4A is a logic flow diagram illustrating a method executed by the communication system of FIG. 1 in managing user equipment traffic offloading procedure in accordance with some embodiments of the present invention.
Figure 4B:
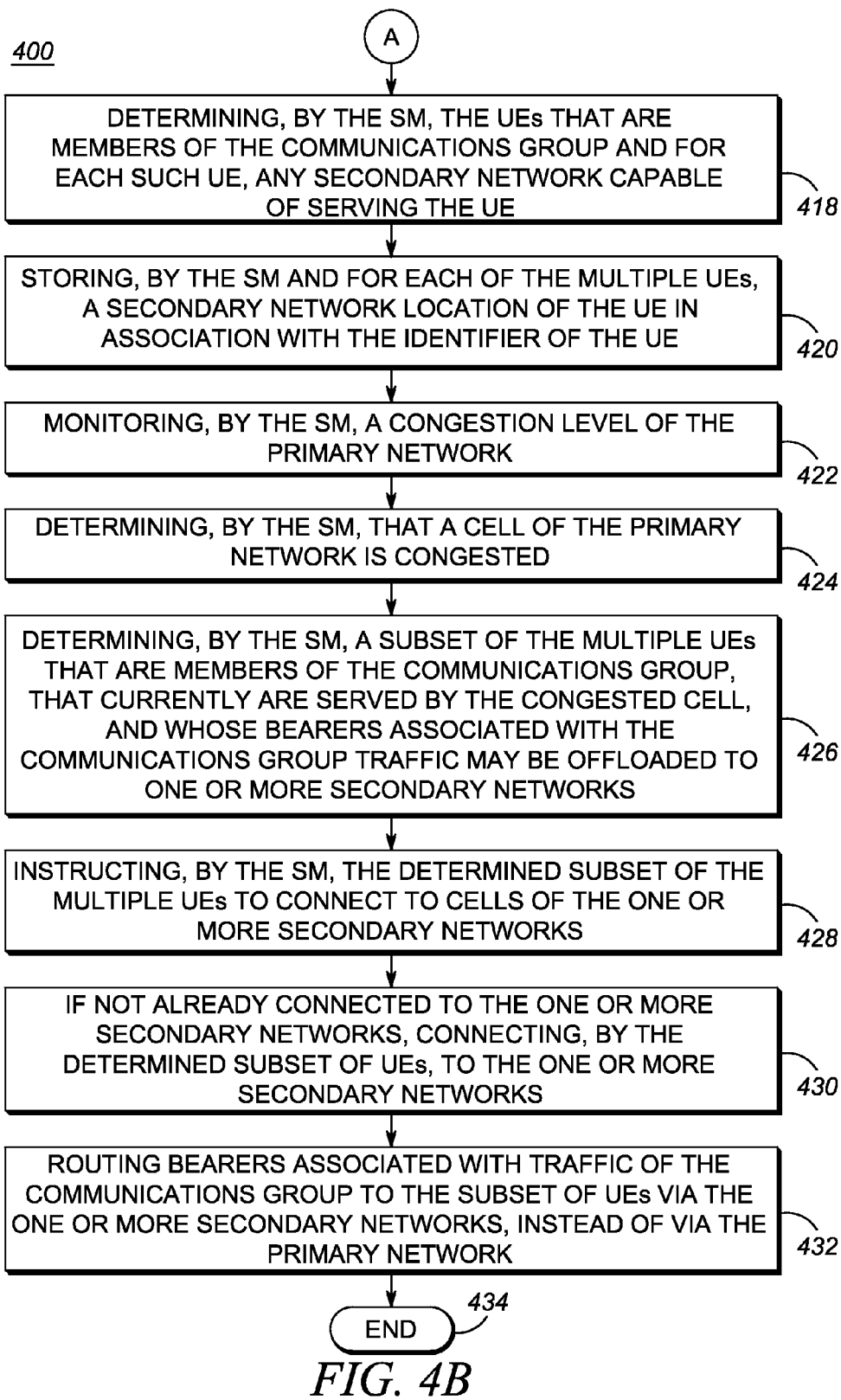
FIG. 4B is a continuation of the logic flow diagram of FIG. 4A illustrating a method executed by the communication system of FIG. 1 in managing user equipment traffic offloading procedure in accordance with some embodiments of the present invention.

Referring now to FIGS. 4A and 4B, a logic flow diagram 400 is provided that illustrates a method performed by communication system 100 in managing a user equipment traffic offloading procedure in accordance with various embodiments of the present invention. Logic flow diagram 400 begins (402) when a group communication session is established among the members of communications group 106, that is, UEs $102_1$-$102_3$ and $104_1$-$104_3$, in accordance with known techniques. More particularly, SM 142 receives (404), from an application running on AF 144, a bearer establishment request associated with a communication session involving communications group 106. The bearer establishment request comprises group session information that includes an identifier of the type of application, an identifier of each UE that is a member of communications group 106, that is, UEs $102_1$-$102_3$ and $104_1$-$104_3$, for example, a subscriber unit identifier (SUID), an International Mobile Subscriber Identifier (IMSI), a mobile equipment identifier (MEID), Internet Protocol address or any other identifier known in the art that may be used to identify a UE, an identifier of the communications group, an identifier of the type of media that will be transmitted, for example, audio or video, and application-related information as known in the art, such as a Quality of Service (QoS) request by the application, bandwidth expected to be consumed by the said application.

In response to receiving the bearer establishment request, SM 142, and in particular traffic offloading procedure management function 308, stores (406), in at least one memory device 304, the group session information and forwards the bearer establishment request to EPC 110. Thus, SM 142 maintains, in at least one memory device 304, as association between the communications group identifier for communications group 106 and a list of UE identifiers for UEs that are members of the communications group, that is, UEs $102_1$-$102_3$ and $104_1$-$104_3$, and bearer parameters such as bandwidth requirements.

In response to receiving the bearer establishment request from SM 142, EPC 110 determines (408) one or more bearer parameters associated with the request, such as Quality of Service (QoS) parameters (for example, Allocation and Retention Priority (ARP), Guaranteed Bit Rate (GBR) v. non-GBR, Maximum Bit Rate (MBR), and QoS Class Identifier (QCI)) associated with the bearers that will be allocated to the session. EPC 110 further determines (410) a location in primary network 110 of each UE that is a member of the communications group using known standard methods, for example, by reference to the HSS included in the EPC or a paging mechanism etc. EPC 110 then sets up (412) a dedicated bearer for each UE $102_1$-$102_3$, $104_1$-$104_3$ that is a member of communications group 106 via the cell and eNodeB of primary network 110 serving the UE, that is, cell $116_1$ and eNodeB $112_1$ with respect to UEs $102_1$-$102_3$ and cell $116_2$ and eNodeB $112_2$ with respect to UEs $104_1$-$104_3$. Alternatively, when no dedicated bearers are available, EPC 110 may reject a bearer request from the SM 142 and instead use a default bearer for each UE $102_1$-$102_3$, $104_1$-$104_3$ that is a member of communications group 106 via the cell and eNodeB of primary network 110 serving the UE For example, the PCRF of EPC 114 may determine one or more bearer parameters associated with the request, such as Quality of Service (QoS) parameters (for example, Allocation and Retention Priority (ARP), Guaranteed Bit Rate (GBR) v. non-GBR, Maximum Bit Rate (MBR), and QoS Class Identifier (QCI)) associated with the bearers that will be allocated to the session. For each UE that is a member of communications group 106, the PCRF then provides this information, along with the bearer establishment request, to the PDN GW of EPC 114 and the PDN GW initiates a procedure to set up the requested bearers by conveying a request to the MME of EPC 114 to set up one or more associated bearers. In some embodiments, when the PCRF is not present, the PDN-GW takes on the PCRF role, as well. In response to receiving the bearer establishment request from PDN GW, the MME conveys a bearer setup request or a bearer reservation request to the eNodeB serving the UE. When the eNodeB receives the bearer setup request or the bearer reservation request, the eNodeB allocates the requested bearer to the UE.

In one embodiment of the present invention, when an eNodeB allocates a bearer to a UE, the eNodeB then may generate a signaling message which causes SM 142 to be informed of each bearer establishment, thereby informing (414) traffic offloading procedure management function 308 of the allocated bearer, including an associated bearer identifier. In one embodiment, the eNodeB may additionally inform (414) the SM 142 of the associated primary network 110 cell serving the UE. In another embodiment of the present invention, the location information regarding each UE, such as the associated primary network 110 cell identification, Global Positioning System coordinates, etc., can be obtained (414) by the SM 142 through a separate entity such as a location manager (not shown), for example, the HSS of EPC 114, that keeps track of the location of each UE in the system by either periodically receiving this information directly from the UE gratuitously or by requesting this information directly from the UE or some elements in infrastructure 150.

In yet another embodiment of the present invention, in response to receiving a request to setup a bearer, the eNodeB may only inform SM 142 when a bearer cannot be allocated (as opposed to when a bearer can be allocated), for example, by conveying a negative acknowledgement (NACK) bearer establishment request back to the SM. When the SM fails to receive a NACK within a predetermined period of time, the SM, that is, traffic offloading procedure management function 308, may assume that a bearer has been allocated to the UE. SM 142, and in particular traffic offloading procedure management function 308, then may determine a corresponding cell serving the UE, for example, cell $112_1$ with respect to UEs $102_1$-$102_3$ and cell $112_2$ with respect to UEs $104_1$-$104_3$. In one such embodiment of the present invention, SM 142 may query the PCRF of EPC 114, via the Rx interface, for the identity of the eNodeB and cell serving each such UE. In response to receiving the query from SM 142, the PCRF may retrieve, from another element of EPC 114 such as the HSS (and in the event that the PCRF does not already maintain such information), an identifier of a cell that serves the UE and provides the maintained/retrieved cell identifier to SM 142. For example, the cell identifier may comprise one or more of a Physical Cell Identifier (PCI), a Target Cell Identifier (TCI), and a E-UTRAN Cell Global Identifier (ECGI). The PCRF then may inform (414) SM 142, and in particular traffic offloading procedure management function 308, of the primary network 110 cell serving the UE by providing the retrieved cell identifier to SM 142 via the Rx interface. As mentioned before, in alternate embodiments, the location information regarding each UE such as the associated primary network 110 cell identification, Global Positioning System coordinates etc. can be obtained by the SM 142 through a separate entity such as a location manager (not shown) that keeps track of the location of each UE in the system by either periodically receiving this information directly from the UE gratuitously or by requesting this information directly from the UE or some elements in the infrastructure 150. In some embodiments, the location manager (not shown) functionality may reside in the SM 142.

SM 142, and in particular, traffic offloading procedure management function 306, then stores (416), in at least one memory device 304 and for each UE $102_1$-$102_3$, $104_1$-$104_3$ that is a member of the communications group, the received primary network 110 cell identifier in association with the identifier of the UE and the bearer identifier associated with the bearer allocated to the UE.

SM 142, and in particular traffic offloading procedure management function 308, further determines (418), the multiple UEs $102_1$-$102_3$, $104_1$-$104_3$ that are a members of communications group 106, and any secondary network, and more particularly cell of secondary networks, capable of serving the UEs. SM 142, and in particular, traffic offloading procedure management function 308, then stores (420), in at least one memory device 304, the secondary network coverage areas identifiers, for example, cell identifiers, in association with the identifier of the UE. For example, UEs $102_1$-$102_3$ that are connected to eNodeB $112_1$ of primary network 110 also reside in, and can be served by, cell 126 of secondary network 120, and UEs $104_1$-$104_3$ that are connected to primary network 110 also reside in, and can be served by, cell 136 of secondary network 130.

In one embodiment of the present invention, an indication of a cell of a secondary network whose coverage area overlaps with each eNodeB $112_1$, $112_2$ of primary network 110 can be preprogrammed into SM 142 and maintained in at least one memory device 304 of the SM.

In another embodiment of the present invention, in addition or instead of preprogramming such information into SM 142, each UE $102_1$-$102_3$, $104_1$-$104_3$ that is a member of communications group 106 can provide, to SM 142, an indication of a secondary network cell capable of serving the UE. For example, SM 142, and in particular traffic offloading procedure management function 308, may request a neighbor list from each of UEs $102_1$-$102_3$, $104_1$-$104_3$. As is known in the art, each of UEs $102_1$-$102_3$, $104_1$-$104_3$, while being served by a serving cell $116_1$, $116_2$, monitors a signal quality metric of reference signals received from neighboring cells, such as, a signal strength, an error rate, a signal-to-noise ratio, a carrier-to-interference plus noise ratio, or any other signal quality metric known in the art. In response to the request, each UE $102_1$-$102_3$, $104_1$-$104_3$ then reports back to SM 142, and in particular to traffic offloading procedure management function 308, a list of neighbor cells, of both primary network 110 and secondary networks 120 and 130, whose monitored signal quality metric exceeds a signal quality metric threshold. For example, UEs $102_1$-$102_3$ serviced by cell $116_1$/eNodeB $112_1$ may report a neighbor list that includes cell $116_2$ and cell 126 and UEs $104_1$-$104_3$ serviced by cell $116_2$/eNodeB $112_2$ may report a neighbor list that includes cell $116_1$ and cell 136. In other embodiments, SM 142 can obtain the information about the UEs $102_1$-$102_3$, $104_1$-$104_3$ that are within a cell 126, 136 of a secondary network 120, 130 by communicating directly with the secondary network 120, 130 either through the core network 124, 134 or directly with the access node 122, 132.

While the group communication session is on-going, SM 142 monitors (422) a congestion level of primary network 110, and more particularly of the cells $116_1$, $116_2$ serving the UEs $102_1$-$102_3$, $104_1$-$104_3$ that are members of communications group 106. If SM 142 determines (424) that there is congestion in one of the cells, for example, cell $116_1$, serving the UEs that are members of communications group 106, SM 142 determines (426) a subset, for example, UEs $102_1$-$102_3$, of the multiple UEs $102_1$-$102_3$, $104_1$-$104_3$ that are members of communications group 106, that are currently served at the congested cell, that is, cell $116_1$, and whose bearers associated with communications group 106 traffic may be offloaded to one or more secondary networks, for example, secondary network 120. However, in other embodiments of the present invention, one of more of the subset of UEs, that is, UEs $102_1$-$102_3$, that are members of communications group 106 and that are currently served at the congested cell may reside in multiple cells of one or more secondary networks. For example, UEs $102_1$ and $102_2$ that are currently served at congested cell $116_1$ also may reside in cell 126 of secondary network 120 while UE $102_3$ that also is currently served at congested cell $116_1$ also may reside in cell 136 of secondary network 130. In such an event, all three UEs' bearers associated with communications group 106 traffic may be moved to their respective secondary networks and cells. In one such event, where there exists a common secondary cell such as cell 126 amongst the UEs $102_1$-$102_3$, such that the signal quality in the common secondary cell 126 is adequate (even if not the best) to support bearers associated with communications group 106 traffic, the common secondary cell 126 would be selected by the SM 142 to move the bearers associated with communications group 106 traffic to.

SM 142 then instructs (428) the determined subset of UEs, that is, UEs $102_1$-$102_3$ to connect to the cell(s) of the one or more secondary networks 120, 130 capable of serving those UEs, for example, by conveying a traffic offload request to each such UE. Each UE of the determined subset of UEs then engages (430) in connecting to the one or more secondary networks in accordance with known techniques for registration and association while simultaneously being connected to primary network 110. In certain embodiments, a UE may already be connected to the secondary network, in which case the step of connecting to the secondary network is optional. Communication system 100 then routes (432) the bearers associated with communications group 106 traffic to the subset of UEs via the secondary network 120, 130 that they connected to for the purpose of traffic offloading, instead of via primary network 110. In one embodiment, SM 142 maps a first set of bearers associated with communications group 106 on primary network 110 to a second set of bearers on the one or more of the secondary networks, where the number of bearers in the first set of bearers may be different than the number of bearers in the second set. For example, the first set of bearers may be dedicated bearers for each UE of the subset of UEs, whereas the second set of bearers can be fewer shared bearers to be shared by the subset of UEs. In such an event, the offloading of group communications traffic from primary network 110 alleviates the primary network congestion while not causing undue burden on the secondary network(s), since fewer bearers are needed to support this traffic. Communication system 100 routes (432) the bearers appropriately even when the number of bearers on the primary and the secondary network may not match. Logic flow diagram 400 then ends (434).

For example, in determining a congestion level of the cells of primary network 110, SM 142 may track all dedicated bearers assigned to the members of the communications group, that is, UEs $102_1$-$102_3$, $104_1$-$104_3$. When SM 142 determines that bearers are getting dropped, the SM may determine a cell associated with the dropped bearers and conclude that the determined cell is congested. By way of another example, the SM clients 206 of UEs participating in the group communication session may report their throughput, for example, QoS-related information, to SM client 306 of SM 142. SM 142 may compare the reported throughput for each UE served by a same cell, for example, UEs $102_1$-$102_3$ served by cell $116_1$, to a throughput threshold maintained in at least one memory device 304 of SM 142. When the reported throughput for a UE falls below the throughput threshold, the SM may conclude that the cell is congested. In making the congestion determination, SM 142 further may compare a number of UEs, whose reported throughput is below the throughput threshold, to a threshold number of UEs. When the number of UEs is greater than the threshold number of UEs, SM 142 then may determine that a cell is congested.

Figure 5A:
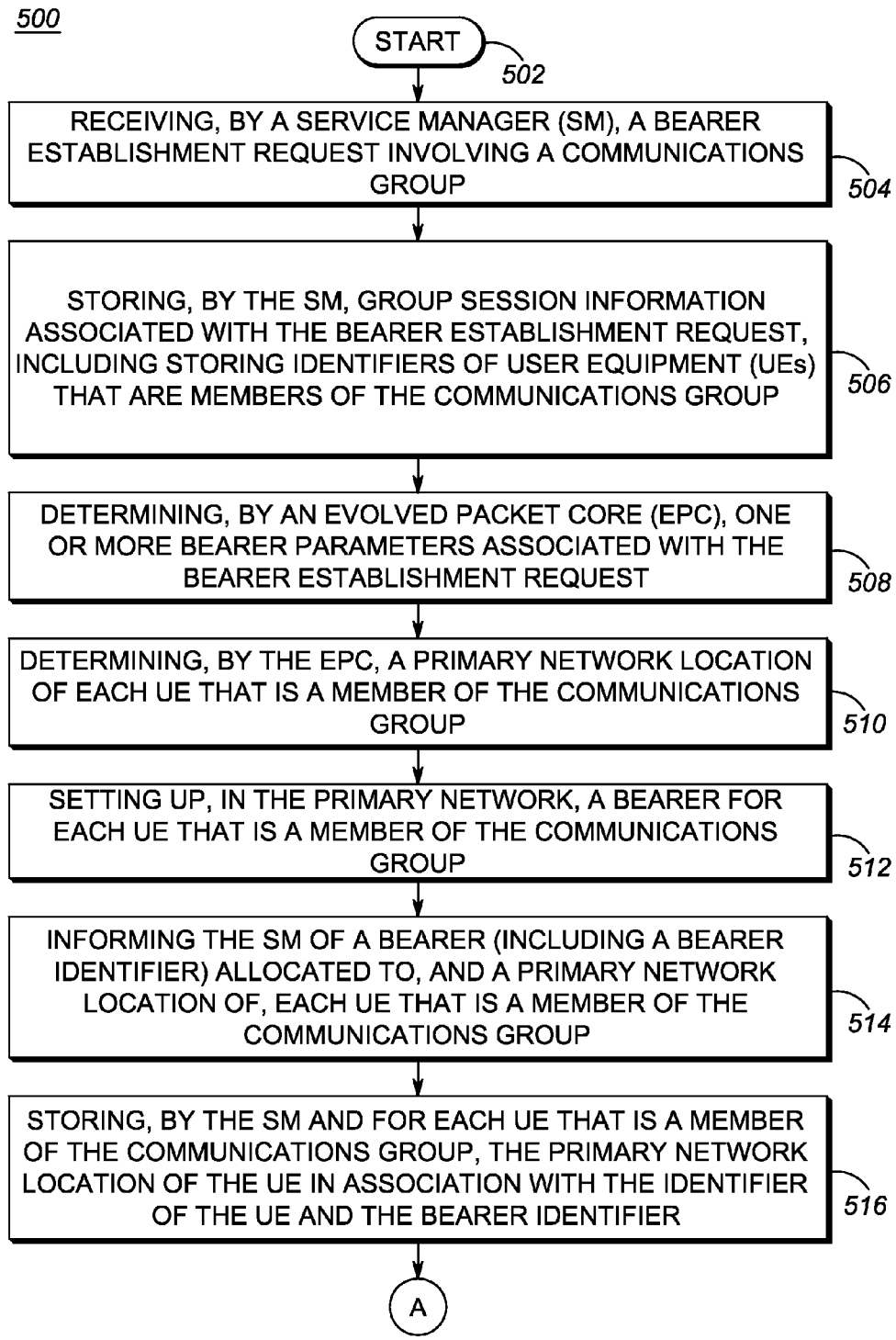
FIG. 5A is a logic flow diagram illustrating a method executed by the communication system of FIG. 1 in managing user equipment traffic offloading procedure in accordance with other embodiments of the present invention.
Figure 5B:
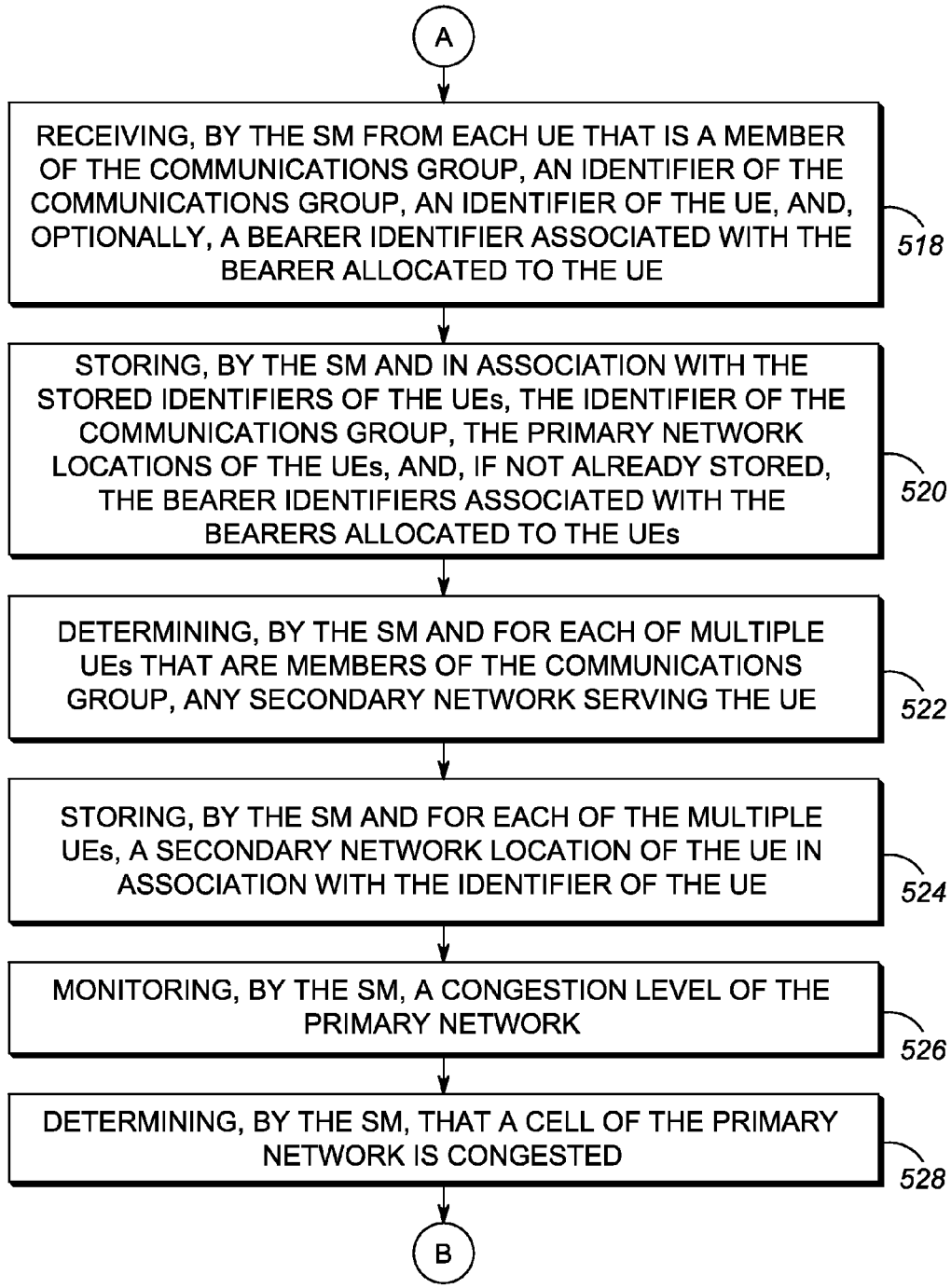
FIG. 5B is a continuation of the logic flow diagram of FIG. 5A illustrating a method executed by the communication system of FIG. 1 in managing user equipment traffic offloading procedure in accordance with other embodiments of the present invention.
Figure 5C:
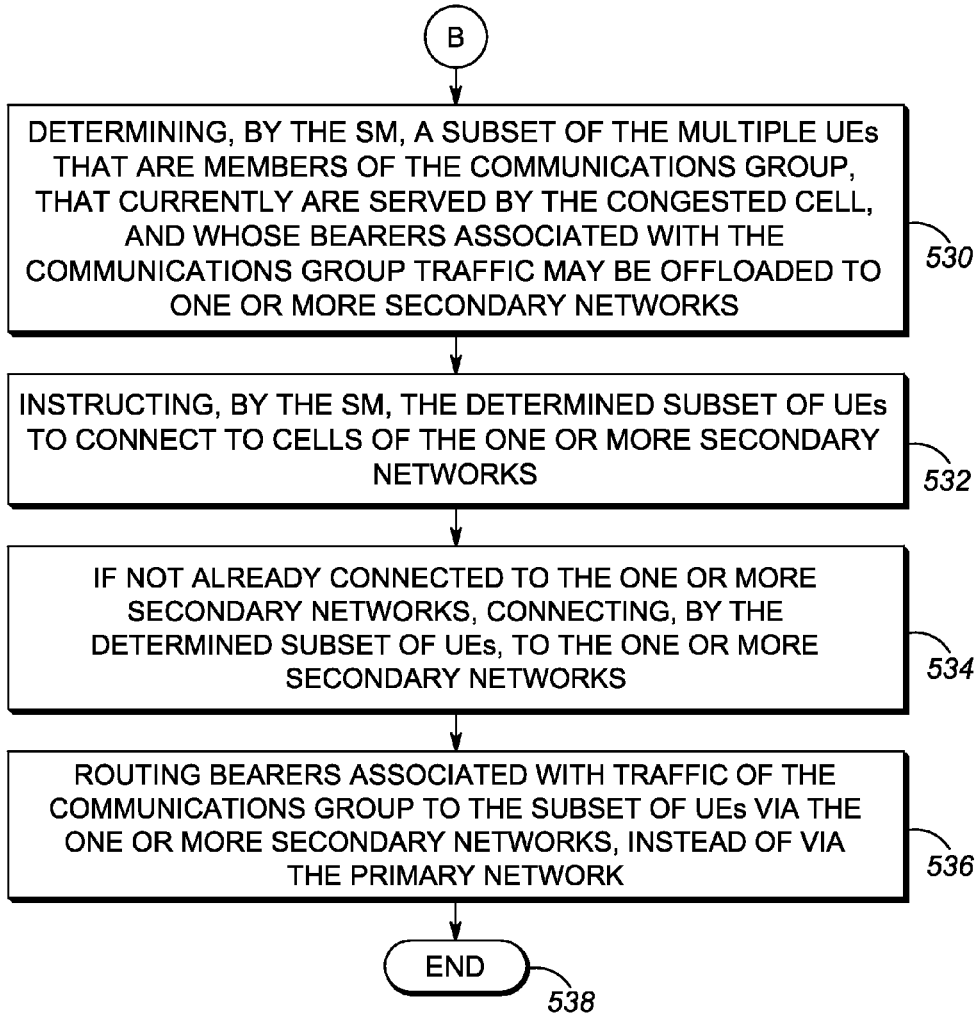
FIG. 5C is a continuation of the logic flow diagram of FIGS. 5A and 5B illustrating a method executed by the communication system of FIG. 1 in managing user equipment traffic offloading procedure in accordance with other embodiments of the present invention.

Referring now to FIGS. 5A, 5B, and 5C, a logic flow diagram 500 is provided that illustrates a method performed by communication system 100 in managing a user equipment traffic offloading procedure in accordance with various other embodiments of the present invention. Similar to logic flow diagram 400, logic flow diagram 500 begins (502) when a group communication session is established among the members of communications group 106, that is, UEs $102_1$-$102_3$ and $104_1$-$104_3$, in accordance with known techniques. More particularly, SM 142 receives (504), a bearer establishment request associated with a communication session involving communications group 106. In one embodiment of the present invention, the bearer establishment request is received from an application running on AF 144. In another embodiment of the present invention, the bearer establishment request is received from an application running on the UEs $102_1$-$102_3$ and $104_1$-$104_3$, such as SM client 206. In yet another embodiment of the present invention, the bearer establishment request is received from a communication node residing in the infrastructure 150. The bearer establishment request comprises group session information that includes an identifier of the type of application, an identifier of each UE that is a member of communications group 106, that is, UEs $102_1$-$102_3$ and $104_1$-$104_3$, for example, a subscriber unit identifier (SUID), an International Mobile Subscriber Identifier (IMSI), a mobile equipment identifier (MEID), Internet Protocol address, or any other identifier known in the art that may be used to identify a UE, an identifier of the type of media that will be transmitted, for example, audio or video, and application-related information as known in the art, such as a Quality of Service (QoS) request by the application, bandwidth expected to be consumed by the said application.

In response to receiving the bearer establishment request, SM 142, and in particular traffic offloading procedure management function 308, stores (506), in at least one memory device 304, the group session information and forwards the bearer establishment request to EPC 110. In response to receiving the bearer establishment request from SM 142, EPC 110 determines (508) one or more bearer parameters associated with the request, such as Quality of Service (QoS) parameters and (510) a location, in primary network 110, of each UE that is a member of the communications group. EPC 110 then sets up (512) a dedicated bearer for each UE $102_1$-$102_3$, $104_1$-$104_3$ that is a member of communications group 106 via the cell and eNodeB of primary network 110 serving the UE, that is, cell $116_1$ and eNodeB $112_1$ with respect to UEs $102_1$-$102_3$ and cell $116_2$ and eNodeB $112_2$ with respect to UEs $104_1$-$104_3$. Alternatively, when no dedicated bearers are available, EPC 110 may reject a bearer request from the SM 142 and instead use (512) a default bearer for each UE $102_1$-$102_3$, $104_1$-$104_3$ that is a member of communications group 106 via the cell and eNodeB of primary network 110 serving the UE In one embodiment of the present invention, when an eNodeB allocates a bearer to a UE, the eNodeB then may generate a signaling message which causes SM 142 to be informed of each bearer establishment, and thereby traffic offloading procedure management function 308 is informed (514) of the allocated bearer, including a bearer identifier. In one embodiment, the eNodeB may additionally inform (514) SM 142 of the associated primary network 110 cell serving the UE. In another embodiment of the present invention, the location information regarding each UE, such as the associated primary network 110 cell identification, Global Positioning System coordinates, etc., can be obtained (514) by SM 142 through a separate entity such as a location manager (not shown) that keeps track of the location of each UE in the system by either periodically receiving this information directly from the UE gratuitously or by requesting this information directly from the UE or some elements in the infrastructure 150. In yet another embodiment of the present invention, the PCRF of EPC 114 may inform (514) SM 142, and in particular traffic offloading procedure management function 308, of the primary network 110 cell serving the UE by providing a retrieved cell identifier to SM 142 via the Rx interface.

SM 142, and in particular, traffic offloading procedure management function 306, then stores (516), in at least one memory device 304 and for each UE $102_1$-$102_3$, $104_1$-$104_3$ that is a member of communications group 106, the received primary network 110 cell identifier in association with the identifier of the UE and the bearer identifier associated with the bearer allocated to the UE.

Each UE $102_1$-$102_3$, $104_1$-$104_3$ that is a member of communications group 106 then conveys (518), to SM 142 and in particular to traffic offloading procedure management function 308, an identifier of the UE, an identifier of communications group 106, and, optionally, a bearer identifier associated with the bearer allocated to the UE. SM 142, and in particular to traffic offloading procedure management function 308, then stores (520), in at least one memory device 304, the identifier of communications group 106 in association with the stored identifiers of the UEs and the primary network 110 locations of the UEs. In case the bearer identifier is not stored yet, the SM 142 adds that information in association with communications group 106, the identifiers of the UEs, and the primary network 110 locations of the UEs.

Again, similar to logic flow diagram 400, SM 142, and in particular traffic offloading procedure management function 308, determines (522) for each UE that is a member of communications group 106, any secondary network, and more particularly cells of secondary networks, capable of serving the UE. SM 142, and in particular, traffic offloading procedure management function 308, then stores (524), in at least one memory device 304, the secondary network cell identifiers in association with the identifier of the UE.

While the group communication session is on-going, SM 142 monitors (526) a congestion level of primary network 110, and more particularly of the cells $112_1$, $112_2$ serving the UEs $102_1$-$102_3$, $104_1$-$104_3$ that are members of communications group 106. If SM 142 determines (528) that there is congestion in one of the cells, for example, cell $116_1$, serving the UEs that are members of communications group 106, SM 142 determines (530) a subset, for example, UEs $102_1$-$102_3$, of the multiple UEs $102_1$-$102_3$, $104_1$-$104_3$ that are members of communications group 106, that are currently served at the congested cell, that is, cell $116_1$, and whose bearers associated with communications group 106 traffic may be offloaded to one or more secondary networks, for example, secondary network 120.

In other embodiments of the present invention, one of more of the subset of UEs, that is, UEs $102_1$-$102_3$, that are members of communications group 106 and that are currently served at the congested cell also may reside in cells of multiple secondary networks. For example, UEs $102_1$ and $102_2$ that are currently served at congested cell $116_1$ also may reside in cell 126 of secondary network 120, and UE $102_3$ that is currently served at congested cell $116_1$ also may reside in cell 136 of secondary network 130. In such an event, all three UEs' bearers associated with communications group 106 traffic may be moved to their respective secondary networks and cells. In one such event, where there exists a common secondary cell, such as cell 126, amongst the UEs $102_1$-$102_3$ such that the signal quality in the common secondary cell 126 is adequate (even if not the best) to support bearers associated with communications group 106 traffic, the common secondary cell 126 would be selected by the SM 142 to move the bearers associated with communications group 106 traffic to.

SM 142 then instructs (532) the determined subset of UEs, that is, UEs $102_1$-$102_3$, to connect to the cell(s) of the one or more secondary networks 120, 130, for example, by conveying a traffic offloading request to each such UE. Each UE of the determined subset of UEs then engages (534) in connecting to the secondary network 120, 130 in accordance with known techniques for registration and association while simultaneously being connected to primary network 110. In certain embodiments, a UE may already be connected to the secondary network, in which case the step of connecting to the secondary network is optional. Communication system 100 then routes (536) the bearers associated with communications group 106 traffic to the subset of UEs via the secondary network 120, 130 that they connected to for the purpose of traffic offloading, instead of via primary network 110. For example, when access nodes 122, 132 of secondary networks 120, 130 backhaul through EPC 114, or backhaul through EPC 114 and one of eNodeBs $112_1$, $112_2$, then communication system 100 would route the bearers associated with communications group 106 traffic over an air interface 128, 138, associated with a secondary access node 122, 132, instead of over air interfaces $118_1$, $118_2$ associated with eNodeBs $112_1$, $112_2$. In one embodiment, SM 142 maps a first set of bearers associated with communications group 106 on primary network 110 to a second set of bearers on the one or more secondary networks, where the number of bearers in the first set of bearers may be different than the number of bearers in the second set. For example, the first set of bearers can be dedicated bearers for each UE of the subset of UEs, whereas, the second set of bearers can be fewer shared bearers to be shared by the subset of UEs. In such an event, the offloading of group communications traffic from primary network 110 alleviates the primary network congestion while not causing undue burden on the secondary network(s), since fewer bearers are needed to support this traffic. Communication system 100 routes (536) the bearers appropriately even when the number of bearers on the primary and the secondary network may not match. Logic flow diagram 400 then ends (538).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for traffic offloading procedure management in a Public Safety communication system, the method comprising:
   receiving, by a service network element, information comprising an identifier of a communications group, an identifier of each user equipment (UE) of a plurality of UEs that are members of the communications group, and an identifier of a cell of a primary network where each UE of the plurality of UEs resides;
   storing, by the service network element and in association with the identifier of each UE of the plurality of UEs, the identifier of the communications group and the identifier of the cell of the primary network where each UE of the plurality of the UEs resides;
   determining, by the service network element, that a cell of the primary network is congested;
   in response to determining that the cell of the primary network is congested, determining, by the service network element, a subset of the plurality of UEs, wherein the subset of the plurality of UEs are members of the communications group, reside in the congested cell, and are capable of being served by one or more secondary networks; and
   instructing, by the service network element, the subset of the plurality of UEs to offload their traffic associated with the communications group to the one or more secondary networks, causing bearers associated with the traffic of the communication group of the subset of the plurality of the UEs to route their traffic via the one or more secondary networks.

2. The method of claim 1, wherein receiving, by the service network element, the identifier of the communications group comprises receiving the identifier of the communications group from an application function.

3. The method of claim 1, where receiving, by the service network element, the identifier of the communications group comprises receiving the identifier of the communications group from each (UE) of the plurality of UEs.

4. The method of claim 3, wherein receiving, by the service network element, the identifier of the communications group from each (UE) of the plurality of UEs comprises receiving, by an application layer client of the service network element, the identifier of the communications group from an application layer client of each UE of the plurality of UEs.

5. The method of claim 1, wherein instructing comprises instructing the subset of the plurality of UEs to offload their traffic associated with the communications group to the one or more secondary networks while engaged in a group communication session involving the communications group.

6. The method of claim 1, further comprising setting up a group communication session involving the communications group, wherein setting up the group communication session comprises setting up one of a dedicated bearer and a default bearer in association with each user equipment (UE) of the plurality of UEs.

7. The method of claim 1, wherein instructing the subset of the plurality of UEs to offload their traffic associated with the communications group to the one or more secondary networks comprises instructing the subset of the plurality of UEs to hand off to a plurality of secondary networks.

8. The method of claim 1, wherein a secondary network of the one or more secondary networks backhauls data through a different core network than is used by the primary network.

9. The method of claim 1, wherein a secondary network of the one or more secondary networks backhauls data through a same core network as is used by the primary network.

10. The method of claim 1, wherein storing, by the service network element and in association with the identifier of each UE of the plurality of UEs, the identifier of the communications group and the identifier of the cell of the primary network where the UE resides, further comprises storing one or more bearer identifiers associated with the communications group.

11. A services network element that provides for traffic offloading procedure management in a Public Safety communication system, the services network element comprising:
a processor;
one or more network interfaces that are configured to receive information comprising an identifier of a communications group, an identifier of each user equipment (UE) of a plurality of UEs that are members of the communications group, and an identifier of a cell of a primary network where each UE of the plurality of the UEs resides; and
at least one memory device that is configured to store instructions that, when executed by the processor, cause the processor to:
store, in association with the identifier of each UE of the plurality of UEs, the identifier of the communications group and the identifier of the cell of the primary network where the UE resides;
determine that a cell of the primary network is congested;
in response to determining that the cell of the primary network is congested, determine a subset of the plurality of UEs, wherein the subset of the plurality of UEs are members of the communications group, reside in the congested cell, and are capable of being served by one or more secondary networks; and
instruct the subset of the plurality of UEs to offload their traffic associated with the communications group to the one or more secondary networks, causing bearers associated with the traffic of the communication group of the subset of the plurality of the UEs to route their traffic via the one or more secondary networks.

12. The services network element of claim 11, wherein the stored instructions, when executed, cause the processor to receive the identifier of the communications group by receiving the identifier of the communications group from an application function.

13. The services network element of claim 11, wherein the stored instructions, when executed, causes the processor to receive the identifier of the communications group by receiving the identifier of the communications group from each (UE) of the plurality of UEs.

14. The services network element of claim 13, wherein the stored instructions, when executed, cause the processor to receive the identifier of the communications group from each (UE) of the plurality of UEs by receiving, by an application layer client of the service network element, the identifier of the communications group from an application layer client of each UE of the plurality of UEs.

15. The services network element of claim 11, wherein the stored instructions, when executed, cause the processor to instruct the subset of the plurality of UEs to hand off by instructing the subset of the plurality of UEs to offload their traffic associated with the communications group to the one or more secondary networks while engaged in a group communication session involving the communications group.

16. The services network element of claim 11, wherein the at least one memory device is configured to store instructions that, when executed, cause the processor to set up a group communication session involving the communications group, wherein setting up the group communication session comprises setting up one of a dedicated bearer and a default bearer in association with each user equipment (UE) of the plurality of UEs.

17. The services network element of claim 11, wherein the stored instructions, when executed, cause the processor to instruct the subset of the plurality of UEs to offload their traffic associated with the communications group by instructing the subset of the plurality of UEs to hand off to a plurality of secondary networks.

18. The services network element of claim 11, the network interface is configured to receive backhauled data from a secondary network of the one or more secondary networks via a different core network than is used by the primary network.

19. The method of claim 11, wherein a secondary network of the one or more secondary networks backhauls data through a same core network as is used by the primary network.

20. A system that provides for traffic offloading procedure management in a Public Safety communication system, the system comprising:
a plurality of user equipment that are each a member of a same communications group;
a services network element that is configured to:
receive information comprising an identifier of the communications group, an identifier of each user equipment (UE) of the plurality of UEs, and an identifier of a cell of a primary network where each UE of the plurality of UEs resides;

store, in association with the identifier of each UE of the plurality of UEs, the identifier of the communications group and the identifier of the cell of the primary network where each UE of the plurality of the UEs resides;

determine that a cell of the primary network is congested;

in response to determining that the cell of the primary network is congested, determine a subset of the plurality of UEs, wherein the subset of the plurality of UEs are members of the communications group, reside in the congested cell, and are capable of being served by one or more secondary networks; and instruct the subset of the plurality of UEs to offload their traffic associated with the communications group to the one or more secondary networks, causing bearers associated with the traffic of the communication group of the subset of the plurality of the UEs to route their traffic via the one or more secondary networks.

* * * * *

UNITED STATES PATENT AND TRADEMARK OFFICE
CERTIFICATE OF CORRECTION

PATENT NO. : 9,107,130 B2  
APPLICATION NO. : 13/920537  
DATED : August 11, 2015  
INVENTOR(S) : Aparna Pandey et al.

Page 1 of 2

It is certified that error appears in the above-identified patent and that said Letters Patent is hereby corrected as shown below:

IN THE TITLE PAGE:

In Item (71), under "Applicant," in Column 1, Line 1, delete "INC," and insert -- INC., --, therefor.

IN THE SPECIFICATION:

In Column 8, Line 61, delete "EPC 110." and insert -- EPC 114. --, therefor.

In Column 9, Line 2, delete "EPC 110" and insert -- EPC 114 --, therefor.

In Column 9, Line 8, delete "EPC 110" and insert -- EPC 114 --, therefor.

In Column 9, Line 12, delete "EPC 110" and insert -- EPC 114 --, therefor.

In Column 9, Line 18, delete "EPC 110" and insert -- EPC 114 --, therefor.

In Column 9, Line 22, delete "the UE" and insert -- the UE. --, therefor.

In Column 10, Line 16, delete "a E-UTRAN" and insert -- an E-UTRAN --, therefor.

In Column 10, Line 33, delete "function 306," and insert -- function 308, --, therefor.

In Column 13, Line 8, delete "EPC 110." and insert -- EPC 114. --, therefor.

In Column 13, Lines 9-10, delete "EPC 110" and insert -- EPC 114 --, therefor.

In Column 13, Lines 13-14, delete "EPC 110" and insert -- EPC 114 --, therefor.

Signed and Sealed this  
Twenty-first Day of June, 2016

Michelle K. Lee  
*Director of the United States Patent and Trademark Office*

CERTIFICATE OF CORRECTION (continued)
U.S. Pat. No. 9,107,130 B2

IN THE SPECIFICATION:

In Column 13, Line 21, delete "EPC 110" and insert -- EPC 114 --, therefor.

In Column 13, Line 25, delete "the UE" and insert -- the UE. --, therefor.

In Column 13, Line 50, delete "function 306," and insert -- function 308, --, therefor.

IN THE CLAIMS:

In Claim 19, Column 18, Line 56, delete "The method of" and insert -- The services network element of --, therefor.